Dec. 23, 1924.  
L. MAURY  
1,520,067  
MECHANISM FOR AUTOMATICALLY LOCKING CARRIAGE DOORS  
Filed April 29, 1924  2 Sheets-Sheet 1

Inventor  
Leon Maury  
By  
B. Singer, Atty.

Patented Dec. 23, 1924.

1,520,067

UNITED STATES PATENT OFFICE.

LÉON MAURY, OF BEGLES, FRANCE.

MECHANISM FOR AUTOMATICALLY LOCKING CARRIAGE DOORS.

Application filed April 29, 1924. Serial No. 709,817.

*To all whom it may concern:*

Be it known that I, LÉON MAURY, mechanician, a citizen of France, and a resident of Begles, in the Department of Gironde, France, have invented some new and useful Improvements in Mechanisms for Automatically Locking Carriage Doors, of which the following is a specification.

This invention relates to devices for locking automatically carriage doors and its object is to devise improvements especially in connection with the mechanism disclosed in the United States Patent application 649,314 of July third 1923.

In this application there is a description of a system for automatically locking carriage doors, in which system the bolts or latches of the door locks are operated by the motion of the wheels of the vehicles as soon as the train starts. This motion is imparted to the whole system, and in the first place to a pulley which is permanently in tangential contact with one of the wheels of the vehicle. This pulley is mounted on a shaft which is carried by a suitable box fitted below the carriage, and which drives a governor device, which in turn, by centrifugal action, transforms the rotary motion of the friction pulley into a rectilinear motion. The latter is imparted to a horizontal rod, which in turn is designed in such a manner as to impart, through a system of links and like transmission, the said rectilinear motion to a number of other rods which, finally, act on the bolts of the locks.

The subject matter of the present invention includes as one feature a new design of the friction pulley which actuates the system. The advantage of this new design is that it eliminates the inconveniences of the pitching and rolling motions of the vehicle, the influence of which might, in certain circumstances, be prejudicial to the working of the system.

In the present invention are also embodied further alterations with regards to the fitting and shape of the parts, which will be pointed out in the description below.

On the accompanying drawings to which reference is made:—

Figure 4:
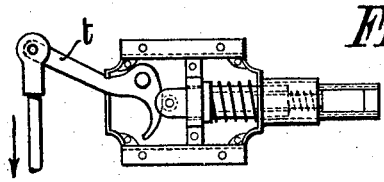
Figure 4 is a detailed view.

Independently of the alterations made to the form of certain parts, such as the box A, the centrifugal weights the lever $t$ (Figure 4), et cetera, an important alteration of construction and fitting has also been made to the driving mechanism of the box, in connection with the movable disc $d$ and with the forked lever $i$ which works jointly with the disc. In accordance with the invention described in the patent application No. 649,314 this lever was bent and articulated on a rib of the box. This fork was solid with the lever, and it could happen, therefore, that it was not always in perfect contact with the supporting face of the disc which controls the displacement of the said lever, as well as of the rod-gear by means of which the motion is transmitted. The disc $d$ and the fork $i$ are now designed in a different manner.

Figure 1:
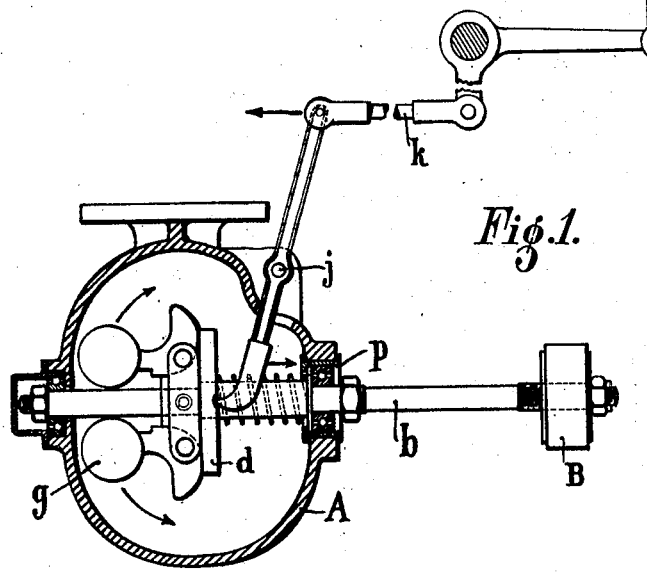
Figure 1 shows a section through the altered lock-controlling mechanism, in its position of rest.
Figure 2:
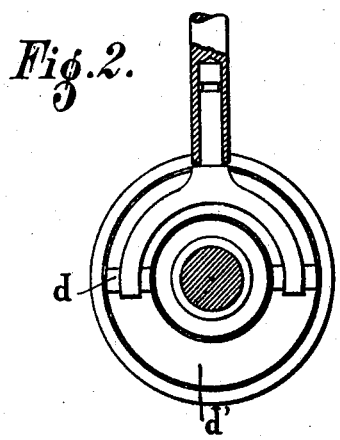
Figures 2 and 3 show respectively a front-view of, and a section through, an altered part of the driving mechanism.
Figure 3:
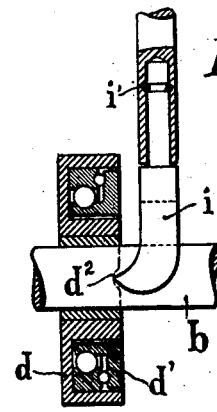

The disc $d$ which is loose on the shaft $b$ is fitted with a ball-bearing $d^1$ (Figures 2 and 3). The displacements imparted to the said disc under the influence of the centrifugal force imparted to the weights $g$ are transmitted to the lever which is articulated at point $j$ and which carries the bent fork $i$.

This fork is fitted on a ball-joint at point $i^1$, in such a manner that its two prongs rest, in their normal position, on the ball-bearing $d^1$ of the disc $d$, whatever may be the motion imparted to the whole system, and fit in the slots or recesses $d^2$. This system of fitting is very advantageous in that it avoids any wear and tear of the prongs of the fork, and transmits, in a normal manner, the motion of the disc $d$ to the system of levers. The other end of the fork is articulated on the rod $k$ which controls the various safety locks, as in the patent application No. 649,314.

The said pulley, instead of being driven direct by friction from the carriage wheel, is rotated by friction on a wooden pulley P which is keyed on the axle of the wheel.

Figure 6:
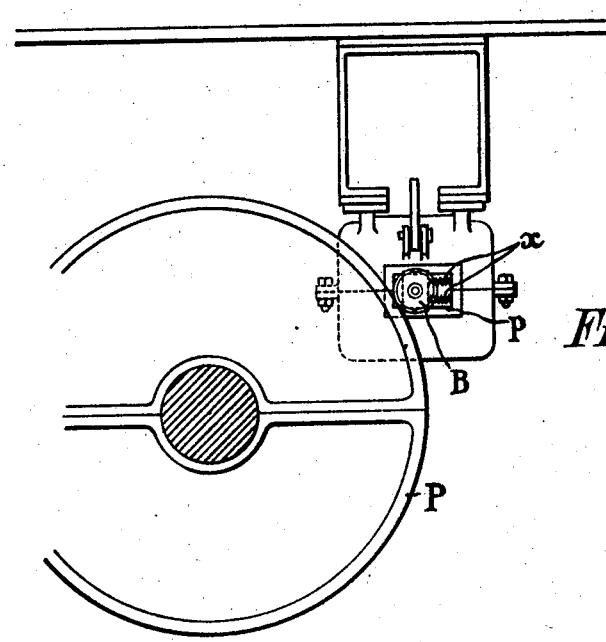
Figure 6 is a front view.

With a view to ensuring that these pulleys will work in accordance with the various laws of rolling friction, they are fitted with a material which gives them a maximum friction grip. Furthermore, the friction on starting and during the motion is proportional to the normal pressure. This pressure and permanent contact of the two pulleys are obtained by means of springs $x$ which are included in the patent application No. 649,314 and which are fitted against the slide-bearing $p$ of box A (Figure 6).

It is necessary to bear in mind the following facts:—

Figure 5:
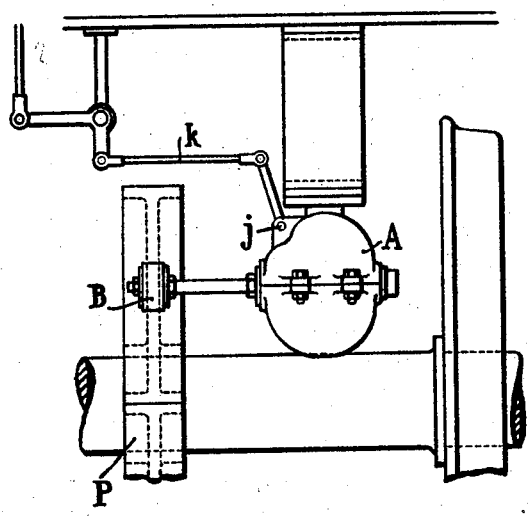
Figure 5 shows a side-view of the new arrangement of the friction pulley with regard to the wheel of the vehicle which drives the system.

The apparatus being attached rigidly to the floor of the carriage (Figures 5 and 6), and the driving pulley P being keyed on the axle of the wheels, it is necessary to take into account the rolling and pitching motions of the carriage.

The new arrangement of wheel B eliminates the effects of these two motions which could be detrimental to the good working of the apparatus. It will be readily understood that the amplitude of these motions will be so much smaller as the driving pulley P will be fitted more closely to the axle of the carriage. It is even of advantage to key the pulley P as closely as possible to the said axle.

The present invention allows of the pulley B carrying out a minimum lateral displacement of 5 cm. which is more than sufficient to avoid any torsion or breakage of shaft $b$. With regard to upward and downward pitching motions, the slide $p$ would again play a useful part by compressing the springs $x$, and ensuring thus close contact with a wide range of movement.

It is thus shown that perfect contact of pulley B with its driver is obtained in all circumstances, and that a constant working of the centrifugal system $g$ which controls the automatic closure of the safety locks is ensured in consequence. In view of the fact that the said locks do not form an essential part of the present improvements, and are described in detail in the patent application No. 649,314, it is not considered necessary to further describe their working and in the drawing which is attached hereto is merely embodied a drawing of a type of these locks, with its box, in the position of rest, in which the driving mechanism is also shown.

What I claim, is:—

1. In centrifugally operated mechanism for locking carriage doors, a shaft, a centrifugal governor on the same, a loose disc on the shaft, a fork to communicate movement to a linkage actuating the locks, a ball bearing for said disc, to constitute the supporting surface for said fork, and means to transmit motion from said governor through said disc and ball bearing to the fork.

2. In centrifugally operated mechanism for locking carriage doors, a shaft, a centrifugal governor in rigid connection with said shaft, a disc loose on said shaft, a ball bearing for said disc, a fork to communicate movement to a linkage actuating the locks, a lever in said linkage, to carry said fork, a ball-joint as mounting means of said fork on said lever, means to engage the prongs of said fork the supporting face of the said disc, and means to transmit motion of said governor to said linkage through said disc.

3. In centrifugally operated mechanism for locking carriage doors, a shaft, a centrifugal governor on said shaft, a disc loose on said shaft, means to actuate slidably said disc from said governor, a ball bearing for said disc, a fork to communicate movement to a linkage actuating the locks, a lever in said linkage, to carry said fork, a ball-joint to connect said lever with said fork, bent prongs on said fork, and recesses in the supporting face of said disc, in the ball bearing plate for engagement of said prongs.

4. In centrifugally operated mechanism for locking carriage doors, a shaft, a centrifugal governor on the shaft, a loose disc on the shaft, a fork to communicate motion from said governor through said disc to a linkage actuating the locks, a ball bearing for said disc, a ball-joint between said fork and said linkage, a driving pulley of the wheel-axle mounted closely to the axle of the carriage, and means to transmit motion from said axle through said governor and ball bearing to said linkage.

In witness whereof I affix my signature.

LÉON MAURY.